United States Patent
Valsecchi et al.

(10) Patent No.: US 10,730,157 B2
(45) Date of Patent: Aug. 4, 2020

(54) MACHINE TOOL WITH A DEVICE FOR ACTING AGAINST THE WEIGHT OF A MACHINING HEAD

(71) Applicant: Innse-Berardi S.p.A., Brescia (IT)

(72) Inventors: Natale Valsecchi, Brescia (IT); Marcello Marchetti, Brescia (IT); Enrico Marchioni, Brescia (IT)

(73) Assignee: INNSE-BERARDI S.P.A., Brescia (IT)

( * ) Notice: Subject to any disclaimer, the term of this patent is extended or adjusted under 35 U.S.C. 154(b) by 560 days.

(21) Appl. No.: 14/761,723

(22) PCT Filed: Dec. 17, 2013

(86) PCT No.: PCT/IB2013/061044
§ 371 (c)(1),
(2) Date: Jul. 17, 2015

(87) PCT Pub. No.: WO2014/122510
PCT Pub. Date: Aug. 14, 2014

(65) Prior Publication Data
US 2015/0352678 A1 Dec. 10, 2015

(30) Foreign Application Priority Data
Feb. 7, 2013 (IT) .............................. BS2013A0012

(51) Int. Cl.
*B23Q 11/00* (2006.01)
*B24B 41/00* (2006.01)

(52) U.S. Cl.
CPC ........ *B23Q 11/001* (2013.01); *B23Q 11/0014* (2013.01); *B23Q 11/0025* (2013.01);
(Continued)

(58) Field of Classification Search
CPC . Y10T 409/309688; Y10T 409/309744; Y10T 409/3098; B23Q 11/001;
(Continued)

(56) References Cited

U.S. PATENT DOCUMENTS 2,983,199 A * 5/1961 Daugherty ......... B23Q 11/0017
408/235
3,097,568 A 7/1963 Kampmeier
(Continued)

FOREIGN PATENT DOCUMENTS

DE 2904974 A1 8/1980
DE 3045125 A1 7/1982
(Continued)

OTHER PUBLICATIONS

EPO Machine Translation of DE2904974A1—Ernst et al.; "Machine tool with overhung vertically sliding beam has hydraulically loaded tie rod to exert counterbalance moment"; Aug. 21 (Year: 1980).*
(Continued)

*Primary Examiner* — Erica E Cadugan
*Assistant Examiner* — Michael Vitale
(74) *Attorney, Agent, or Firm* — Thomas | Horstemeyer, LLP (57) ABSTRACT

A machine tool (1, 100) comprises a support structure (4, 104) and a machining head (8) bearing a mandrel (12). The machine further comprises at least one action device (20) contained on the support structure (4,104) and applied to it, which generates pushing or pulling actions on said support structure (4, 104) acting against the action of the weight of the head (8) thereon.

17 Claims, 10 Drawing Sheets

(52) U.S. Cl.
CPC ........ *B23Q 11/0028* (2013.01); *B24B 41/007* (2013.01); *Y10T 409/309744* (2015.01)

(58) Field of Classification Search
CPC ............ B23Q 11/0014; B23Q 11/0017; B23Q 15/18; B23Q 11/0025; B23Q 11/0028; B24B 41/007
USPC ........................................ 409/237, 238, 239
See application file for complete search history.

(56) References Cited

U.S. PATENT DOCUMENTS

| | | | | |
|---|---|---|---|---|
| 3,233,521 A * | 2/1966 | Ford | ........................ | B23Q 1/30 409/212 |
| 3,501,840 A | 3/1970 | Schiler | | |
| 3,523,484 A | 8/1970 | Neuman | | |
| 3,656,860 A * | 4/1972 | Neuman | ............ | B23Q 11/0014 408/234 |
| 3,683,744 A * | 8/1972 | Briesofsky | ................ | B23C 1/00 408/235 |
| 3,761,194 A * | 9/1973 | Wagner | .............. | B23Q 11/0028 408/234 |
| 3,896,938 A * | 7/1975 | Eich | ........................ | B23C 1/002 212/279 |
| 4,178,834 A * | 12/1979 | Holmstrom | ........ | B23Q 11/0021 408/1 R |
| 8,545,145 B2 * | 10/2013 | Mizuta | ................... | B23Q 1/012 33/503 |

FOREIGN PATENT DOCUMENTS

| | | | | |
|---|---|---|---|---|
| GB | | 938947 A | 10/1963 | |
| IT | | 2338639 A1 * | 6/2011 | ......... B23Q 11/0014 |

OTHER PUBLICATIONS

Search Report for IT application BS2013A000012 dated Apr. 24, 2013.
International Search Report for PCT/IB2013/061044 dated Mar. 5, 2014.
English Translation of the Abstract for DE 2904974 published on Aug. 21, 1980.
English Translation of the Abstract for DE 3045125 published on Jul. 1, 1982.
English Translation of the Abstract for GB 938947 published on Oct. 9, 1963.

* cited by examiner

MACHINE TOOL WITH A DEVICE FOR ACTING AGAINST THE WEIGHT OF A MACHINING HEAD

CROSS-REFERENCE TO RELATED APPLICATION

This application is the 35 U.S.C. § 371 national stage application of PCT Application No. PCT/IB2013/061044, filed Dec. 17, 2013, which claims priority to and the benefit of, IT Patent Application No. BS2013A000012, filed Feb. 7, 2013, both of which are herein incorporated by reference in their entirety.

The present invention relates to a machine tool, in particular a machine tool of large dimensions, provided with a stiffening device for the support structure of the machining head.

In the machine tools sector, especially those of large dimensions, the need is strongly felt to make a mechanical workpiece with increasingly reduced machine tolerances. Such requirement has repercussions on the manufacturers of such machines, who undertake significant R&D to offer machinery with increasingly improved performance.

The entity of the machine tolerances which can be obtained for a mechanical workpiece is greatly influenced by the mechanical and thermal deformations undergone by the machine components. In particular, a significant portion of such deformations take place in the support structure of the machining head due to the weight of the head itself.

The purpose of the present invention is to make available a machine tool having a support structure of the machining head which overcomes such drawback.

Such purpose is achieved by a machine tool made according to claim 1. The dependent claims describe other embodiments.

The characteristics and advantages of the machine tool according to the present invention will be evident from the description given below, by way of a non-limiting example, according to the appended drawings, wherein.

Figures 1A, 1B:
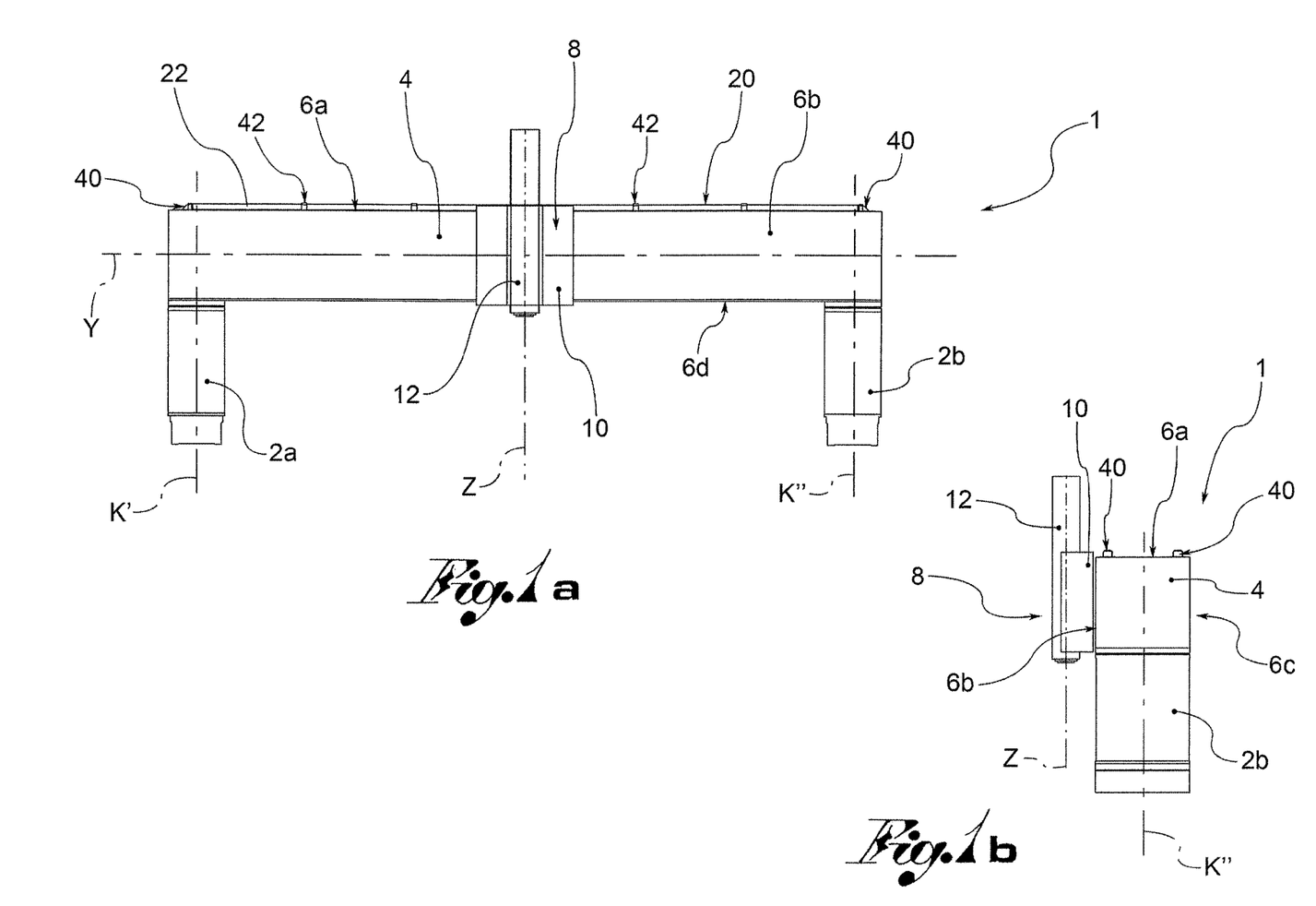
FIGS. 1a to 1c respectively show a front, side and plan view, of a machine tool with a fixed gantry, provided with a support structure of the machining head according to the present invention.
Figure 1C:
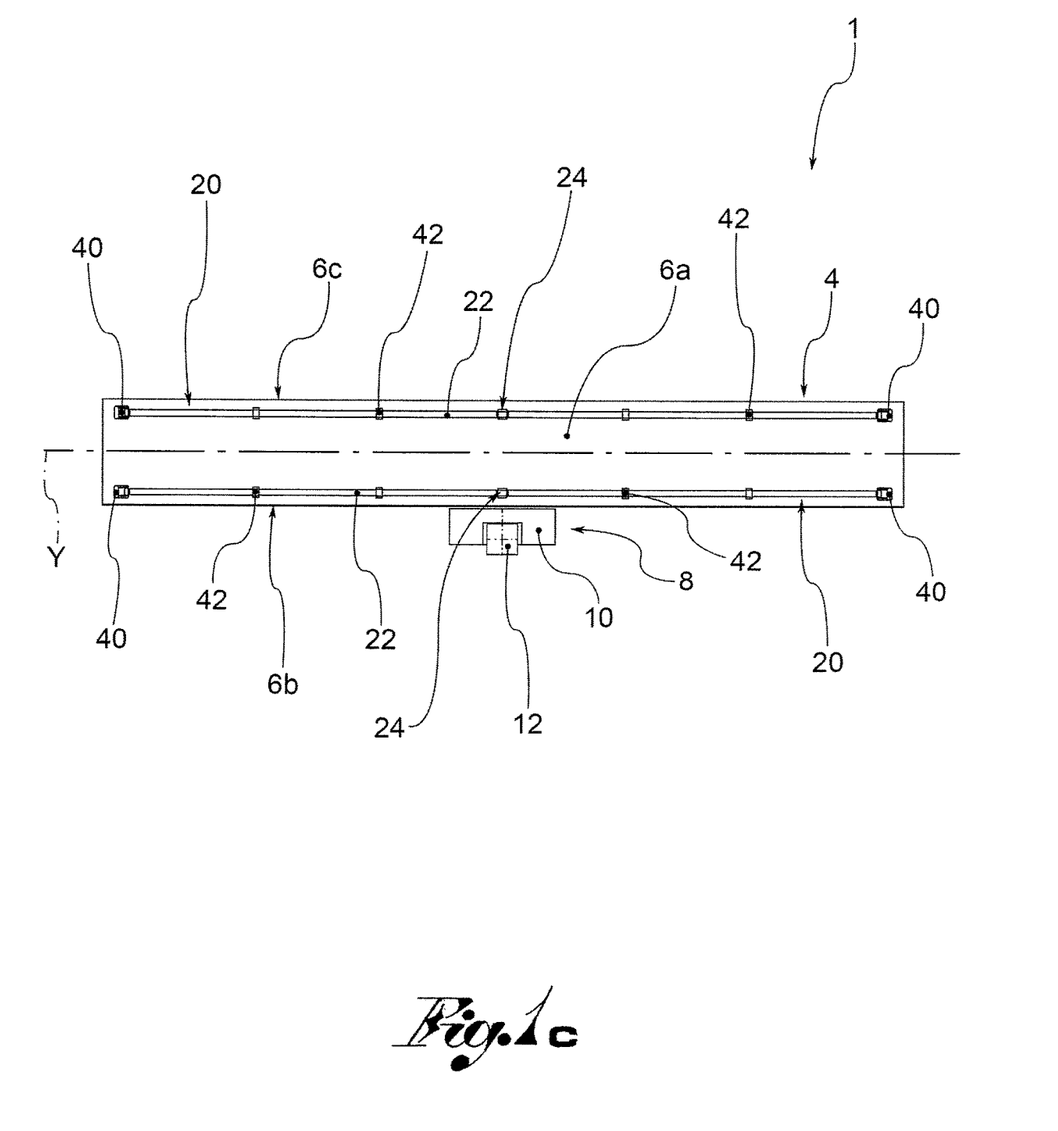

According to the invention, according to FIGS. 1a to 1c, a machine tool 1 is a fixed gantry machine tool, comprising a pair of vertical uprights 2a, 2b, extending along respective vertical axes K', K", distanced transversally along a movement axis Y and attached to foundations made in the ground.

The machine 1 further comprises a cross-member 4 extending along said movement axis Y, supported by two uprights 2a, 2b and fixed in relation thereto.

Preferably, the cross-member 4 has a box-like cross-section, generally quadrangular, so as to prove annularly delimited by an upper surface 6a, a front surface 6b, a rear surface 6c, opposite the front surface 6b, and a lower surface 6d, opposite the upper surface 6a and facing the workpiece to be machined.

In addition, the machine tool 1 comprises a machining head 8, applied to the front surface 6b of the cross-member 4 and supported thereby.

The machining head 8 comprises a carriage 10 supported by the cross member 4 and sliding on command along the movement axis Y, and a mandrel 12, supported by the carriage 10, having a working axis Z and preferably translatable along said working axis.

The cross member 4 thus constitutes a support structure of the machining head 8 and thus suffers the action of the weight of the head, localised in different positions along the movement axis Y, according to the positioning of said head during machining.

The machine tool 1 further comprises an action device 20 contained on the cross member and attached thereto, suitable for generating pushing or pulling actions on said cross member acting against the action of the weight of the machining head thereon.

For example, the action device 20 comprises an action member 22, which acts as a tied-rod or pull-rod depending on whether the action is a push or pull action, composed for example of an elongated tubular element which extends along the movement axis Y.

In addition, the action device 20 comprises actuator means 24 suitable for generating a pushing or pulling action on the action member 22.

Figure 4:
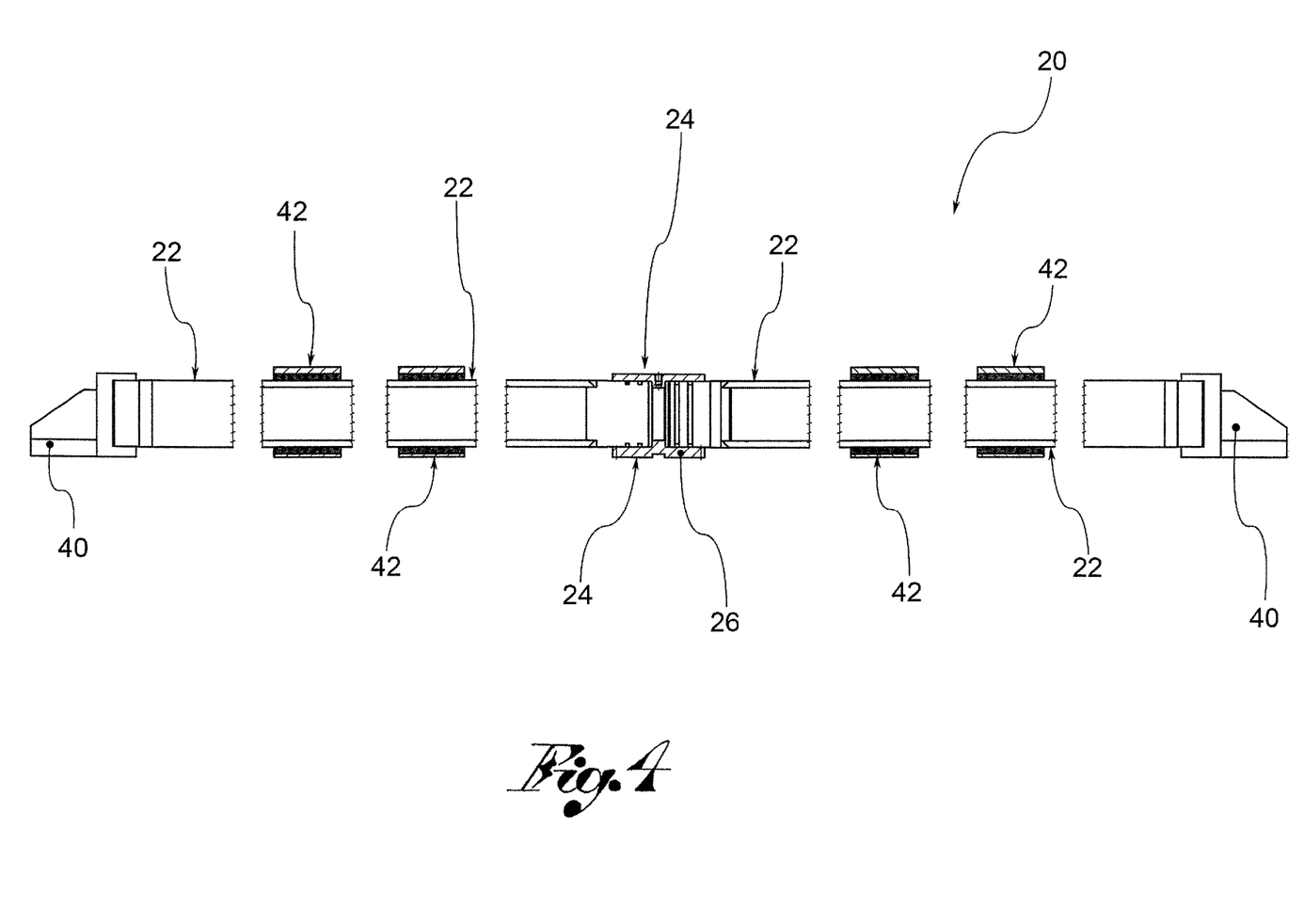
FIG. 4 shows a diagram of an action device of the support structure, according to a hydraulically operated embodiment of the present invention.

For example, the actuator means 24 are hydraulic (FIG. 4).

In such embodiment, the actuator means 24 comprise a cylinder 26, with which the action member 22 is engaged so as to sealingly slide, and hydraulic pressure means for sending pressurised fluid into the cylinder 26 and operating the action member 22.

Figure 5:
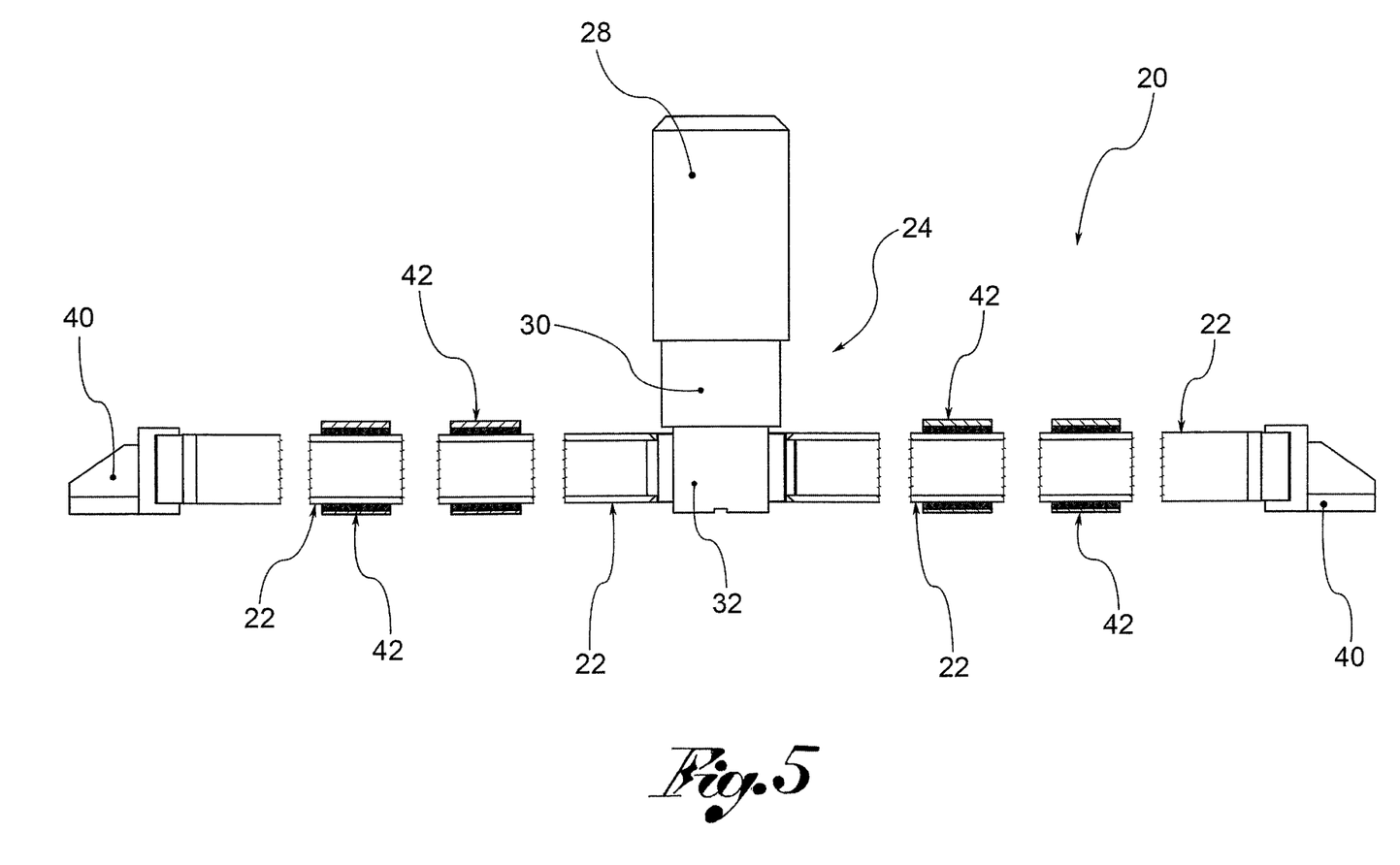
FIG. 5 shows a diagram of an action device of the support structure, according to a mechanically operated embodiment of the present invention.

According to a further example, the actuator means 24 are mechanical or electromechanical (FIG. 5).

In such embodiment, the actuator means 24 comprise an electric motor 28, a reducer 30 connected to the motor 28 and a kinematism 32 connected to the reducer 30, suitable for transforming the rotatory movement of the motor into a translation movement (pushing or pulling) of the action member 22.

In addition, in the aforesaid variants, the action device 20 comprises at least one block 40, connected to the action member 22 and attached to the cross member 4.

In addition, preferably, the action device 20 comprises at least one intermediate support 42, attached to the cross member 4 between the actuator means 24 and the block 40, crossed by said action member 22 in a sliding manner.

Preferably, the action device 20 provides said actuator means 24 and two action members 22, aligned along the horizontal axis Y and opposite each other.

Preferably, moreover, the action device 20 is applied to the front surface 6a of the cross-member 4, for example so that the actuator means 24 are placed in a central position, while the blocks 40 are next to the ends of the cross-member along the movement axis Y.

Preferably, moreover, two action devices 20 are applied to the upper surface 6a of the cross member 4, for example so that the action members 22 are parallel and distanced, one positioned towards the front surface 6b and the other towards the rear surface 6c.

According to a further embodiment of the present invention (FIGS. 2a to 2c), the machine tool 1 is a mobile gantry machine, in which the uprights 2a, 2b are translatable upon command along a secondary axis X, perpendicular to the movement axis Y and to the working axis Z.

Figures 2A, 2B:
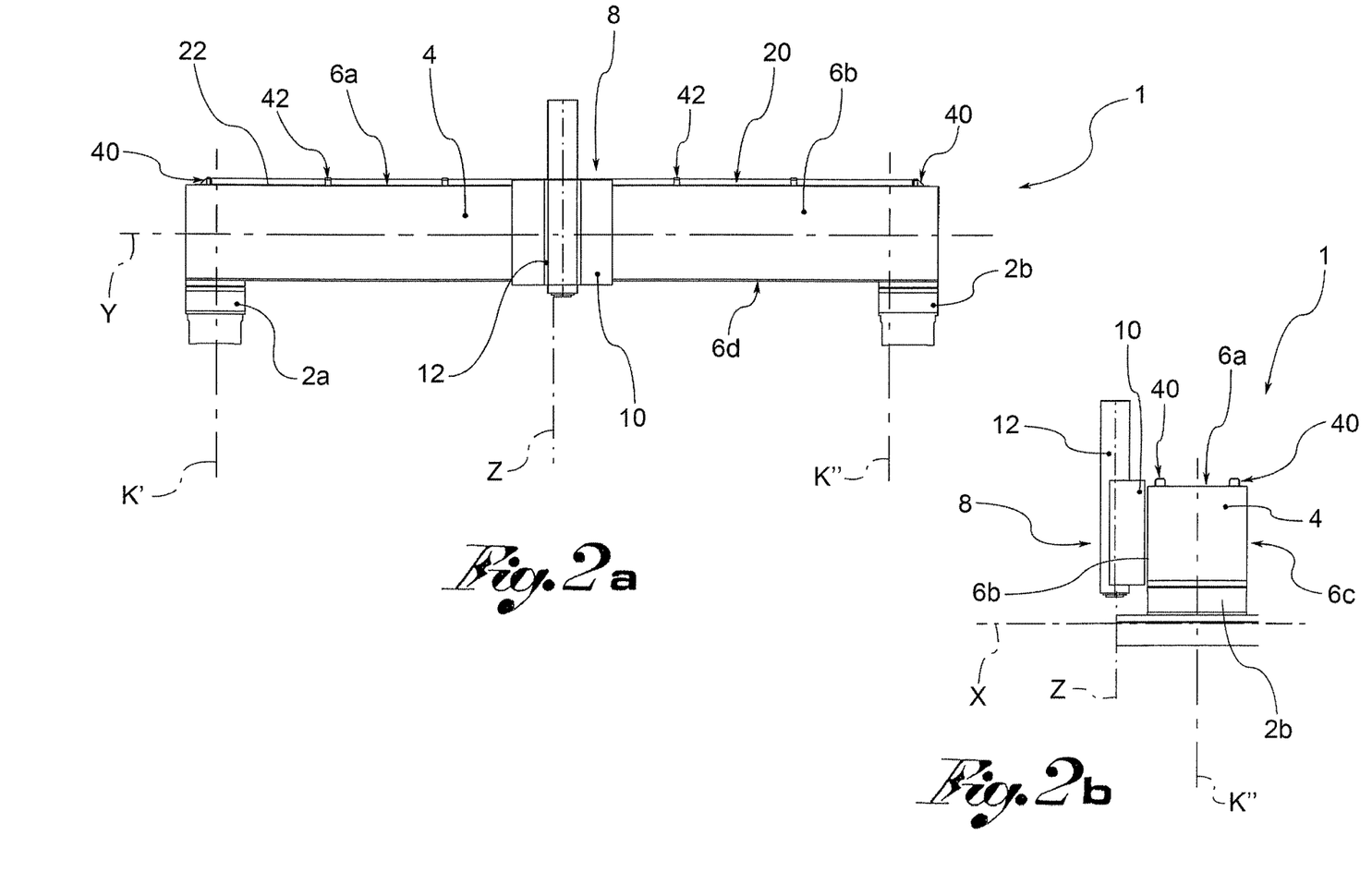
FIGS. 2a to 2c respectively show a front, side and plan view, of a machine tool with a mobile gantry, provided with a support structure of the machining head according to the present invention.
Figure 2C:
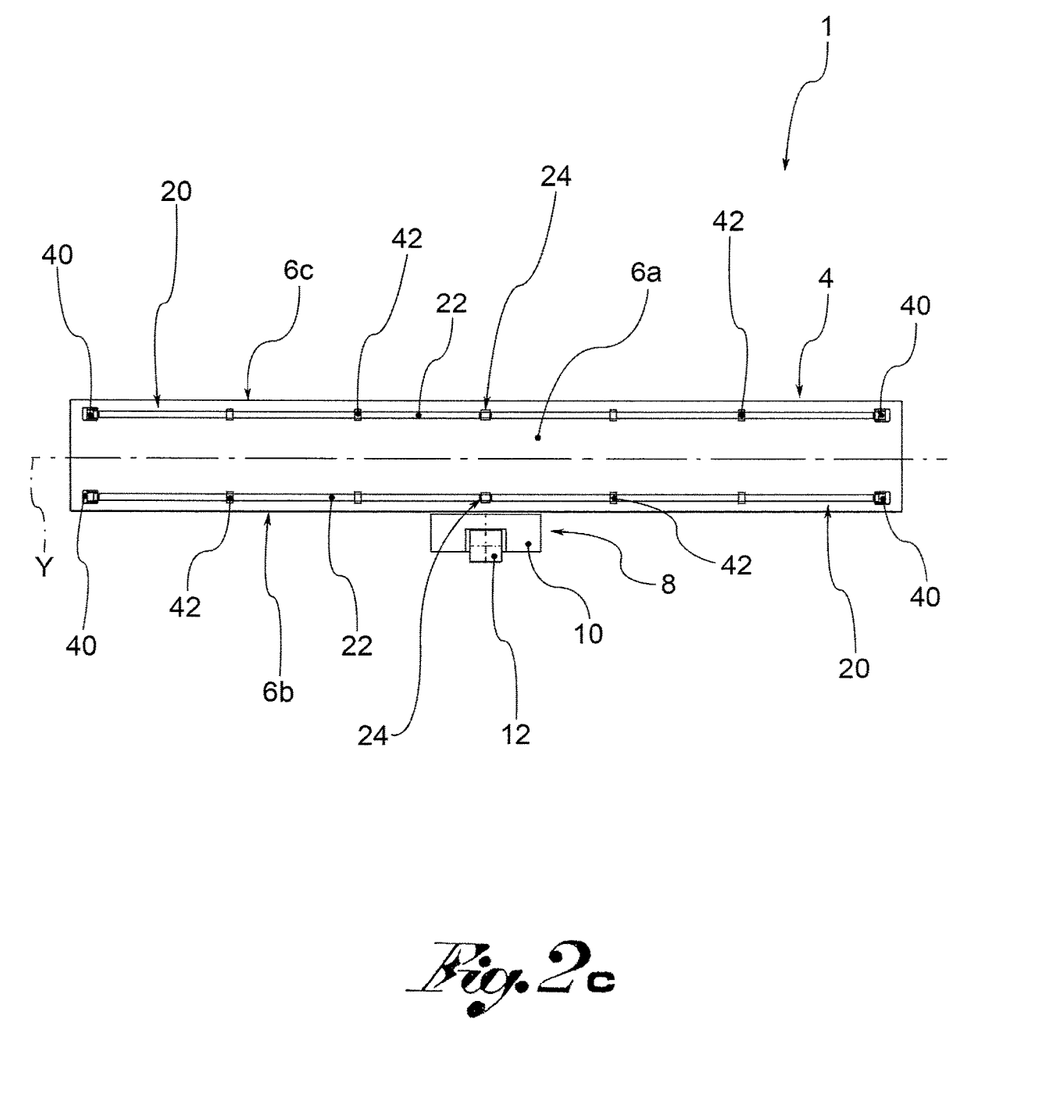

Also according to such embodiment, the support structure of the machining head 8 is the cross member 4.

According to yet a further embodiment (FIGS. 3a and 3b), the machine tool is a machine tool with a vertical upright 100.

Figures 3A, 3B:
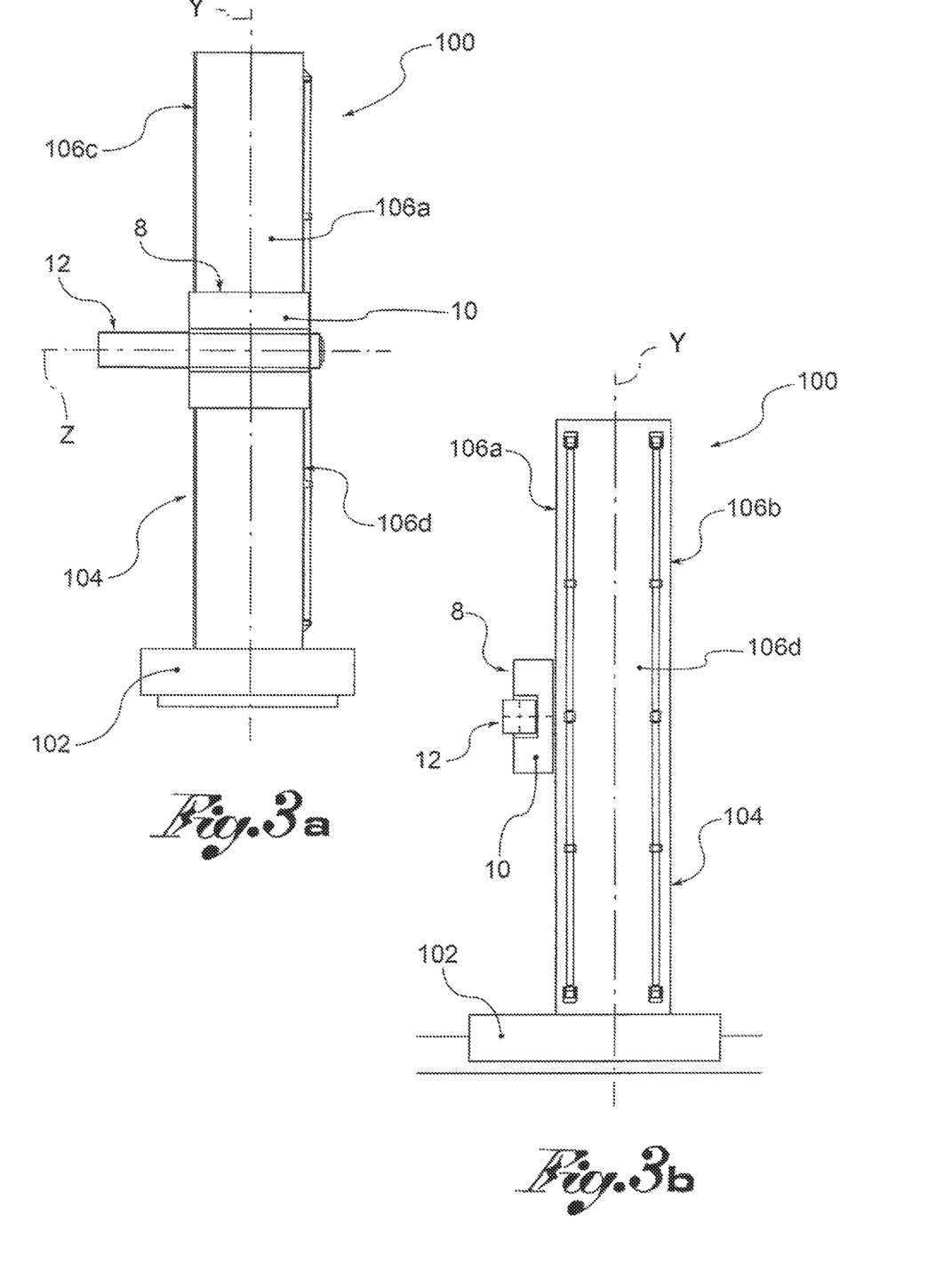
FIGS. 3a and 3b respectively show a side and rear view, of a machine tool with a vertical upright, provided with a support structure of the machining head according to the present invention.

The machine tool 100 comprises a base 102 supported by foundations, and a vertical upright 104 extending along the movement axis Y.

Preferably, the upright 104 has a box-like cross-section, so as to prove annularly delimited by a lateral surface 106a, an opposite lateral surface 106b, opposite the lateral surface 106a, a front surface 106c, facing the workpiece to be machined, and a rear surface 106d, opposite the front surface 106c.

The machine tool 100 further comprises the machining head 8, applied to the lateral surface 106a of the upright 104.

The machining head 8 comprises the carriage 10 supported by the upright 104 and sliding on command along the movement axis Y, and a mandrel 12, supported by the carriage 10, having a working axis Z and preferably translatable along said working axis Z.

The upright 104 thus constitutes the support structure of the machining head 8 and thus suffers the action of the weight of the head, localised in different positions along the movement axis Y, according to the positioning of said head.

The machine tool 100 comprises the action device 20 contained on the upright 104 and attached thereto.

Preferably, the action device 20 is applied to the rear surface 106d of the upright 104, for example so that the actuator means 24 are placed in a central position, while the blocks 40 are next to the ends of the upright along the movement axis Y.

Preferably, moreover, two action devices 20 are applied to the rear surface 106d of the upright 104, for example so that the action members 22 are parallel and distanced, one placed towards the lateral surface 106a and the other towards the opposite lateral surface 106b.

Figure 6A:
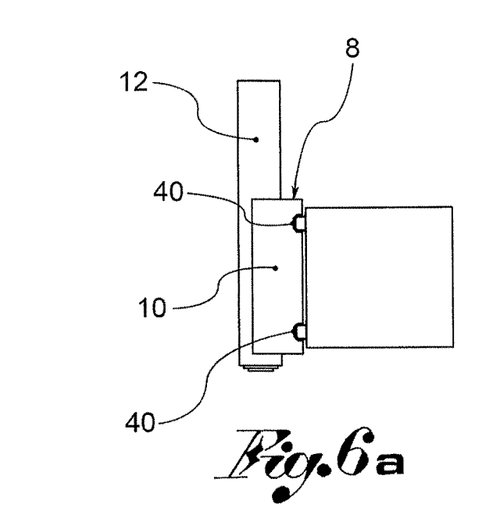
FIGS. 6a to 6h show further embodiment variations of the machine tool according to the invention.
Figure 6B:
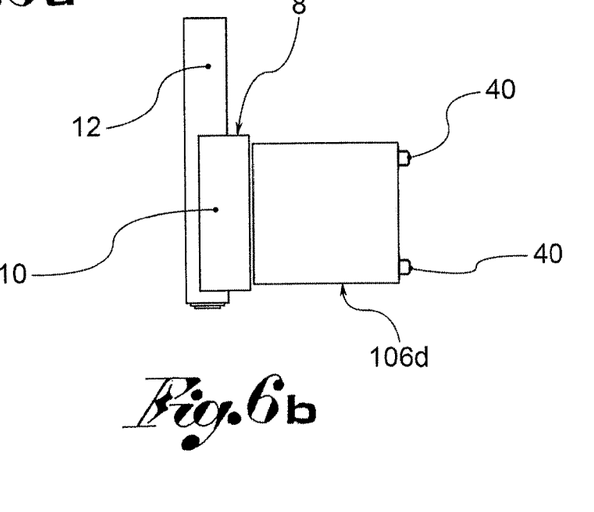

According to further embodiments of the invention, two action devices 20 are positioned on the same surface to which the head 8 is applied (FIG. 6a) or on the surface opposite that to which the head 8 is applied (FIG. 6b).

Figure 6C:
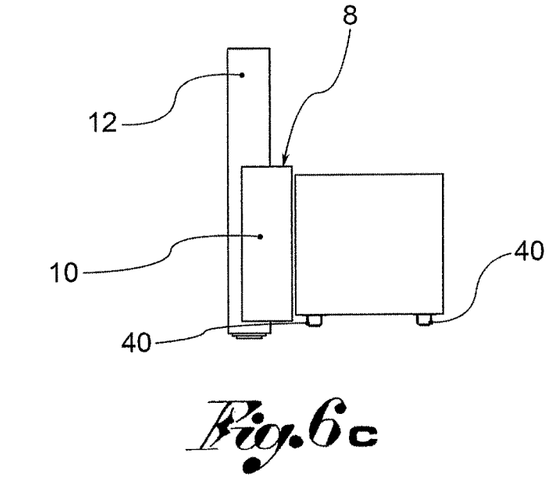
Figure 6D:
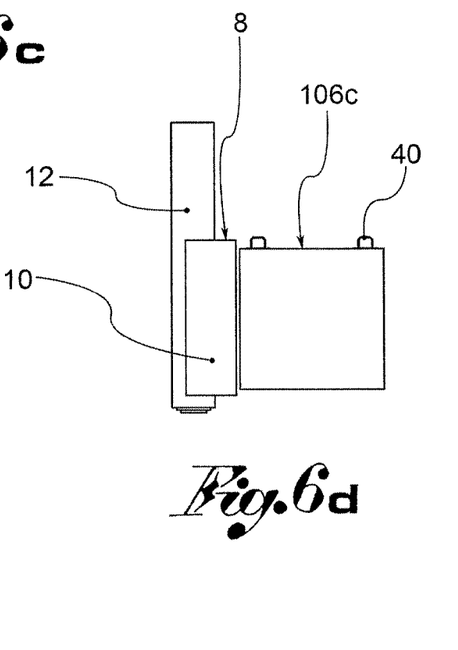

According to yet further embodiments, the two action devices 20 are positioned on surfaces which are neither that to which the head 8 is applied or that opposite it, for example the rear surface 106d (FIG. 6c) or front surface (FIG. 6d).

According to yet further embodiments, the two action devices 20 are positioned singly on a surface, in an asymmetric position to each other in relation to the central axis of the support structure 4, 104.

Figure 6E:
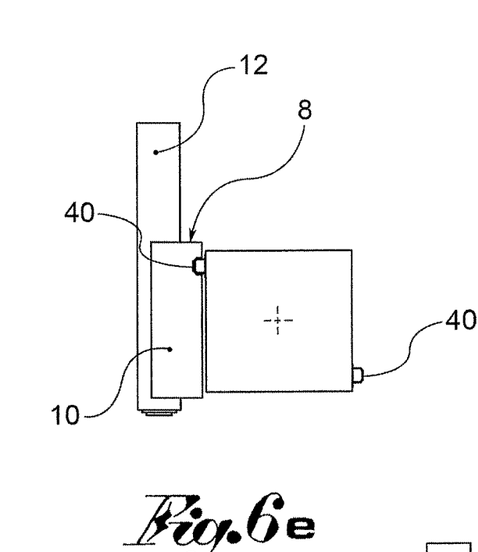
Figure 6F:
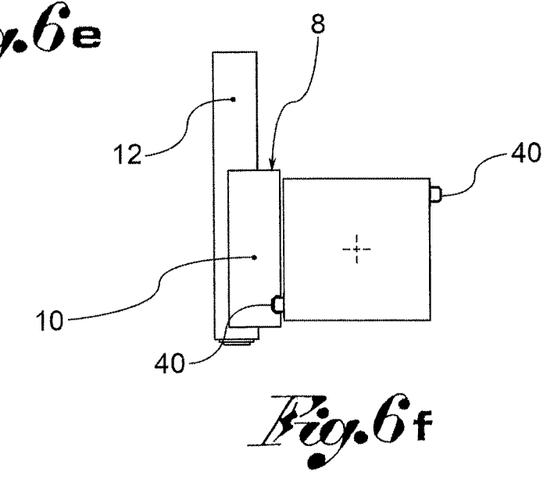

For example, a first action device 20 is positioned on the surface to which the head 8 is applied and a second action device 20 is positioned on the surface opposite to that which the head 8 is applied to, in an asymmetric position in relation to the central axis of the support structure 4, 104 (FIGS. 6e ad 6f).

Figure 6G:
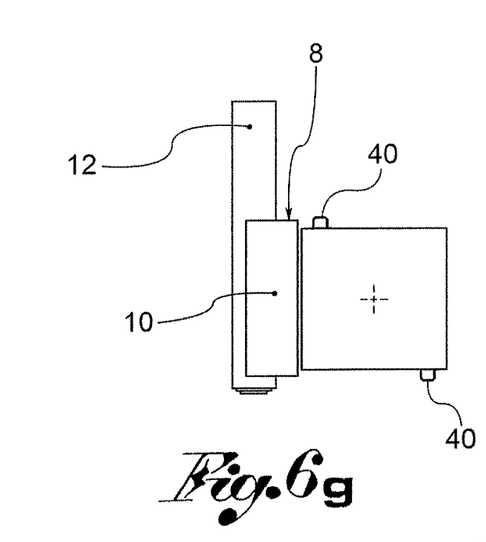
Figure 6H:
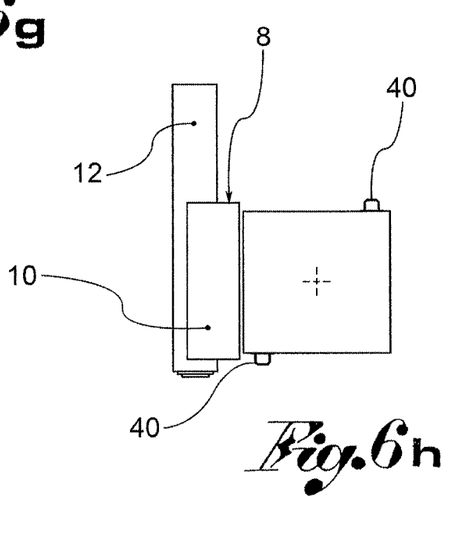

According to a further example, the two action devices 20 are positioned on surfaces which are neither that to which the head 8 is applied or that opposite it, positioned singly on a surface, in an asymmetric position to each other in relation to the central axis of the support structure 4, 104 (FIGS. 6g and 6h).

Preferably, moreover, the machine tool 1, 100 according to the present invention comprises a control system 200 of the action device 20.

Figure 7:
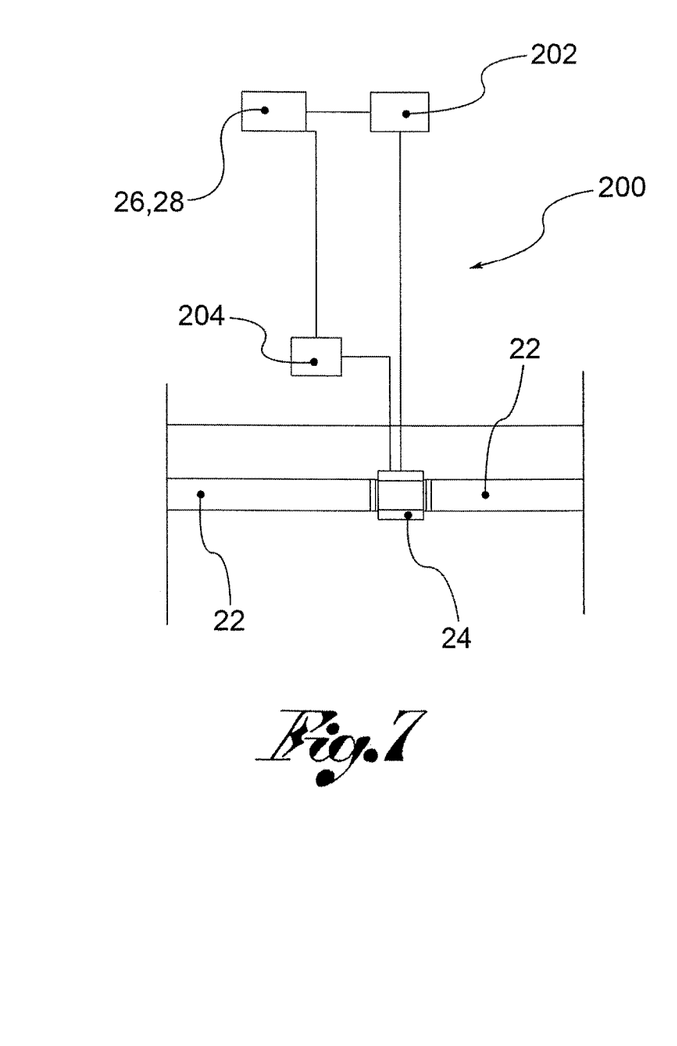
FIG. 7 shows a diagram of a machine tool according to the invention, according to a static control embodiment variation.

According to one embodiment (FIG. 7), the control system 200 comprises an electronic control device 202, for example a PLC or a micro processor, connected to the actuator means 24, and at least one control transducer 204, operatively connected to the actuator means 24 and to the electronic control device 202, suitable for generating a transducer signal for the electronic control device.

Figure 8:
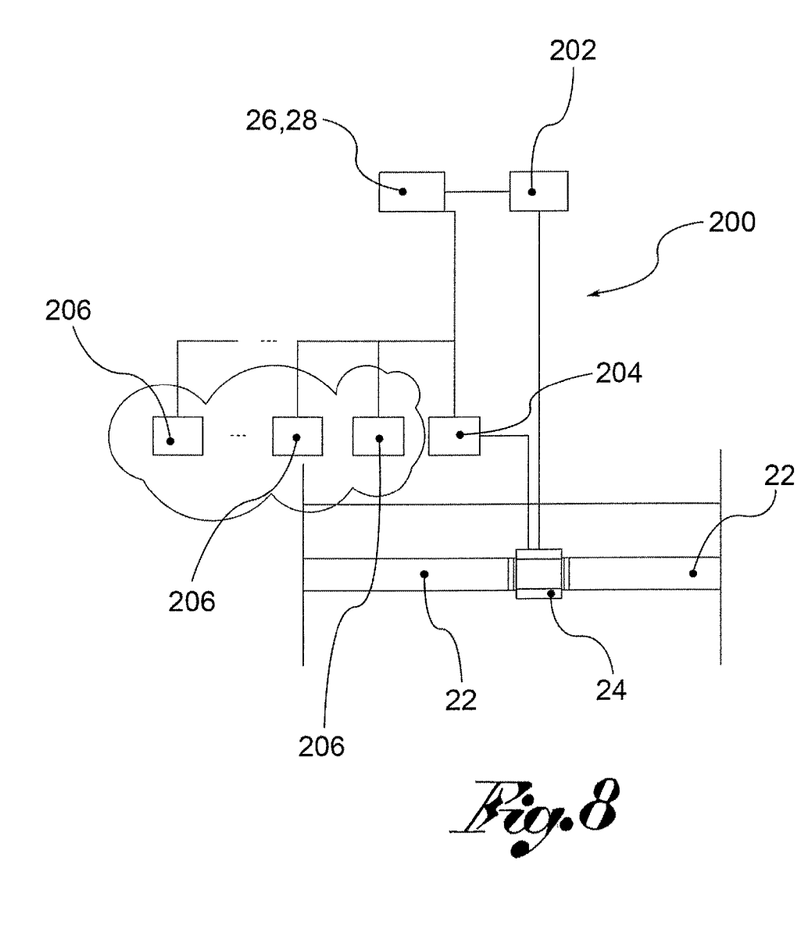
FIG. 8 shows a diagram of a machine tool according to the invention, according to a dynamic control embodiment variation.

According to a further embodiment (FIG. 8), the control system 200 comprises the electronic control device 202, for example a PLC or a micro processor, connected to the actuator means 24, the control transducer 204, operatively connected to the actuator means 24 and to the electronic control device 202 and suitable for generating a transducer signal, and at least one sensor on board the machine 206, suitable for detecting a physical parameter of the machine (for example the deformation in predefined points thereof and in particular of the support structure) and for generating a sensor signal for the electronic control device 202, so as to act on the actuator means 24 depending on the value of said sensor signal.

In the normal functioning of the machine 1, 100 according to the invention, the action device 20 is able to act against the deformation of the support structure 4, 104 due to the weight of the head 8.

In particular, the actuator means 24 act on the action member 22 of the device 20, imposing a pushing or pulling action acting against the deformation of the support structure.

For example, in the embodiment illustrated in FIGS. 1a to 1c, the actuator means, for example hydraulic, push the action members 22 feeding pressurised oil to the cylinder 26. The action of said action members 22 on the upper surface 6a of the cross member 4 is such as to straighten said cross member against the distorting action caused by the weight of the head 8.

Advantageously, moreover, the control system with sensors makes it possible to modify the action of the action device according to the positioning of the head along the support structure.

According to a further advantageous aspect, the intermediate supports prevent phenomena of instability to the axial load arising on the action members.

The invention claimed is:

1. A machine tool comprising:
a support structure having a longitudinal axis, and the support structure being one of a cross-member and a vertical upright;
a machining head, supported by the support structure, comprising a carriage that interfaces with the support structure and a mandrel having a working axis;
at least one action device mounted to a first exterior surface of the support structure, each of the at least one action device comprising:
an action member, which acts as a tie-rod or as a pull rod, and is formed as an elongated tubular member that extends along the longitudinal axis of the support structure, the action member having opposing first and second ends, a block fixed to the first exterior surface of the support structure, said block receiving therein the first end of the action member, an actuator that receives therein the second end of the action member, the actuator being adapted to generate pushing or pulling actions on the action member, the at least one action device adapted to act against deformation of the support structure due to a weight of the machining head acting on the support structure localized in different positions along the longitudinal axis, according to the positioning of said machining head along the longitudinal axis during machining; and a control system of the at least one action device, the control system comprising an electronic control device and at least one sensor on board the machine tool, the at least one sensor configured to detect deformation at predefined points of the support structure and generating a sensor signal for the electronic control device, the control system operatively connected to act on the at least one action device depending on a value of the sensor signal.

2. The machine tool according to claim 1, wherein the machining head is translatable upon command along said longitudinal axis.

3. The machine tool according to claim 1, wherein the at least one action device comprises a first action device and a second action device that are positioned parallel to each other and the longitudinal axis of the support structure.

4. The machine tool according to claim 1, wherein the actuator is a hydraulic actuator comprising a cylinder engaged with the action member, the action member adapted to sealingly slide relative to the hydraulic actuator, the hydraulic actuator being configured to receive pressurized fluid into the cylinder to operate the action member.

5. The machine tool according to claim 1, wherein the actuator is mechanical or electromechanical and comprises an electric motor and a kinematism suitable for transforming a rotatory movement of the electric motor into a translation movement of the action member.

6. The machine tool according to claim 1, wherein the at least one action device further comprises at least one intermediate support that is attached to the first exterior surface of the support structure, and crossed by said action member in a sliding manner.

7. The machine tool according to claim 1, wherein the at least one action device further comprises a second action member, the action member and the second action member aligned along the longitudinal axis of the support structure and disposed on opposite sides of the actuator.

8. The machine tool according to claim 1, wherein the at least one sensor of the control system comprises a plurality of sensors positioned in predefined points and distinct from the support structure.

9. The machine tool according to claim 1, wherein said machine tool is a fixed or mobile gantry machine, and said support structure is embodied as the cross-member that supports the machining head.

10. The machine tool according to claim 9, wherein
the cross-member has an upper surface, a front surface, a rear surface opposite the front surface, and a lower surface opposite the upper surface, and
the machining head interfaces with the front surface of the cross-member, and
the first exterior surface of the support structure to which the at least one action device is mounted is the upper surface.

11. The machine tool according to claim 1, wherein said machine tool is a vertical upright machine and said support structure is embodied as the vertical upright supporting the machining head.

12. The machine tool according to claim 11, wherein
the vertical upright has a front surface, a rear surface opposite the front surface, and two lateral surfaces disposed opposite one another, and
the machining head interfaces with one of the two lateral surfaces of the vertical upright, and the at least one action device is mounted to the rear surface of the vertical upright.

13. The machine tool according to claim 1, wherein the at least one action device comprises at least two action devices, and
the carriage of the machining head interfaces with the first exterior surface of the support structure.

14. The machine tool according to claim 1, wherein the machining head is positioned on a second exterior surface, which is disposed opposite to the first exterior surface to which the at least one action device is mounted, and
the at least one action device comprises at least two action devices.

15. The machine tool according to claim 1, wherein the at least one action device comprises a first action device and a second action device, the first action device being mounted on the first exterior surface of the support structure and the second action device being mounted on the first exterior surface or a different exterior surface of the support structure, the first and second action devices aligned parallel to the longitudinal axis.

16. The machine tool according to claim 1, wherein the action member of the at least one action device is configured to act as the tie-rod or the pull-rod so as to provide pushing or pulling actions on the support structure.

17. The machine tool according to claim 1, wherein the block is a first block and the action member is a first action member, the at least one action device further comprising a second action member connected to the actuator, the second action member extending along the longitudinal axis and being connected to a second block that is fixed to the support structure, the actuator being positioned in a central position between the first and second blocks.

* * * * *